United States Patent
Bharatia

(10) Patent No.: US 11,228,949 B2
(45) Date of Patent: Jan. 18, 2022

(54) INTRA-RAT HANDOVER FOR NEXT GENERATION SYSTEM

(71) Applicant: Samsung Electronics Co., Ltd, Suwon-si (KR)

(72) Inventor: Jayshree A Bharatia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/861,328

(22) Filed: Jan. 3, 2018

(65) Prior Publication Data

US 2018/0199243 A1     Jul. 12, 2018

Related U.S. Application Data

(60) Provisional application No. 62/443,344, filed on Jan. 6, 2017, provisional application No. 62/443,868, filed
(Continued)

(51) Int. Cl.
*H04W 36/00* (2009.01)
*H04W 36/16* (2009.01)
(Continued)

(52) U.S. Cl.
CPC .... *H04W 36/0011* (2013.01); *H04W 36/0027* (2013.01); *H04W 36/0033* (2013.01);
(Continued)

(58) Field of Classification Search
CPC ......... H04W 36/0005; H04W 36/0007; H04W 36/0009; H04W 36/0016; H04W 36/0058;
(Continued)

(56) References Cited

U.S. PATENT DOCUMENTS 8,488,554 B2   7/2013   Yan et al.
8,560,708 B2   10/2013  Nelakonda et al.
(Continued)

FOREIGN PATENT DOCUMENTS

| CN | 101170808 A | 4/2008 |
| CN | 101296225 A | 10/2008 |
| CN | 103385033 A | 11/2013 |

OTHER PUBLICATIONS

3GPP TS 23.501, 3rd Generation Partnership Project; Technical Specification Group Services and System Aspects; System Architecture for the 5G System; Stage 2; Rel. 15, V0.2.0, Jan. 2017. (Year: 2017).*

(Continued)

*Primary Examiner* — Joshua Kading

(57) ABSTRACT

A method of an access and mobility function (AMF) for state management in a wireless communication system is provided. The method comprises determining a state of at least one state machine, receiving, from a target access network (AN), an N2 path switch request message based on the state of the at least one state machine, transmitting, to a session management function (SMF), an N11 message, and transmitting, to the target AN, an N2 path switch request acknowledgement (Ack) message when receiving an N11 Ack message, from the SMF, corresponding to the N11 message, wherein the target AN transmits a release resource message to a source AN when the target AN receives the N2 path switch request Ack message.

7 Claims, 13 Drawing Sheets

Related U.S. Application Data on Jan. 9, 2017, provisional application No. 62/445,074, filed on Jan. 11, 2017, provisional application No. 62/455,638, filed on Feb. 7, 2017, provisional application No. 62/455,629, filed on Feb. 7, 2017.

(51) Int. Cl.

| | | |
|---|---|---|
| *H04W 36/08* | (2009.01) | |
| *H04W 76/20* | (2018.01) | |
| *H04W 76/34* | (2018.01) | |
| *H04W 36/14* | (2009.01) | |
| *H04W 76/11* | (2018.01) | |
| *H04W 8/08* | (2009.01) | |
| *H04W 76/27* | (2018.01) | |

(52) U.S. Cl.
CPC ... *H04W 36/0055* (2013.01); *H04W 36/0066* (2013.01); *H04W 36/0072* (2013.01); *H04W 36/0077* (2013.01); *H04W 36/0079* (2018.08); *H04W 76/34* (2018.02); *H04W 8/08* (2013.01); *H04W 36/08* (2013.01); *H04W 36/14* (2013.01); *H04W 36/165* (2013.01); *H04W 76/11* (2018.02); *H04W 76/20* (2018.02); *H04W 76/27* (2018.02)

(58) Field of Classification Search
CPC ......... H04W 36/0069; H04W 36/0079; H04W 36/0011; H04W 36/0027; H04W 36/0077; H04W 36/0033; H04W 36/0066; H04W 36/0072; H04W 36/0055; H04W 36/08; H04W 36/165; H04W 36/14; H04W 76/10; H04W 76/11; H04W 76/20; H04W 76/27; H04W 76/34; H04W 8/08

See application file for complete search history.

(56) References Cited

U.S. PATENT DOCUMENTS

| | | | |
|---|---|---|---|
| 2008/0233947 A1 | 9/2008 | Herrero-Veron | |
| 2011/0064047 A1 | 3/2011 | Nieminen | |
| 2015/0237532 A1 | 8/2015 | Zhang | |
| 2015/0351139 A1* | 12/2015 | Zhang | H04W 48/16 370/329 |
| 2018/0042057 A1* | 2/2018 | Johansson | H04W 76/10 |
| 2018/0097657 A1* | 4/2018 | Dao | H04L 12/4633 |
| 2018/0115928 A1* | 4/2018 | Kim | H04W 36/0061 |
| 2018/0192337 A1* | 7/2018 | Ryu | H04W 36/0066 |
| 2018/0199398 A1* | 7/2018 | Dao | H04W 36/14 |
| 2018/0227743 A1* | 8/2018 | Faccin | H04L 65/1069 |
| 2019/0037636 A1* | 1/2019 | Kim | H04W 8/02 |
| 2019/0053117 A1* | 2/2019 | Bae | H04W 36/165 |
| 2019/0174573 A1* | 6/2019 | Velev | H04L 12/1407 |
| 2019/0182737 A1* | 6/2019 | Futaki | H04W 36/36 |
| 2019/0191348 A1* | 6/2019 | Futaki | H04W 36/0033 |
| 2019/0274076 A1* | 9/2019 | Kim | H04W 36/00 |
| 2019/0306758 A1* | 10/2019 | Ma | H04W 76/11 |
| 2019/0349819 A1* | 11/2019 | Xu | H04W 36/08 |
| 2020/0053525 A1* | 2/2020 | Byun | H04W 76/23 |
| 2020/0059989 A1* | 2/2020 | Velev | H04W 36/12 |

OTHER PUBLICATIONS

3GPP TS 23.502, 3rd Generation Partnership Project; Technical Specification Group Services and System Aspects; Procedures for the 5G System; Stage 2; Rel. 15, V0.1.1, Jan. 2017. (Year: 2017).*

Nokia; "Interim agreement on Routing of NAS signalling and on How the AMF can select the proper SMF instance for a PDU session"; SA WG2 Meeting #118; S2-166351; Reno, NV, USA; Nov. 14-18, 2016; 5 pages.

"3rd Generation Partnership Project; Technical Specification Group Services and System Aspects; Study on Architecture for Next Generation System (Release 14)"; 3GPP TR 23.799 V14.0.0; Dec. 2016; 522 pages.

Written Opinion of the International Searching Authority for PCT Patent Application No. PCT/KR2018/000357 dated Apr. 11, 2018; 4 pages.

International Search Report for PCT Patent Application No. PCT/KR2018/000357 dated Apr. 11, 2018; 3 pages.

"3rd Generation Partnership Project; Technical Specification Group Services and System Aspects; System Architecture for the 5G System; Stage 2 (Release 15)" 3GPP TS 23.501, V1.6.0, Dec. 2017, 184 pages.

"3rd Generation Partnership Project; Technical Specification Group Services and System Aspects; Procedures for the 5G System; Stage 2 (Release 15)" 3GPP TS 23.502, V1.3.0, Nov. 2017, 215 pages.

Communication pursuant to Article 94(3) EPC in connection with European Application No. 18735839.5 dated Jul. 9, 2020, 6 pages.

Notification of Reason for Refusal in connection with Korean Application No. 10-2019-7019666 dated Jul. 17, 2020, 12 pages.

Huawei, "Procedure of inter-RAT handover without CN change," R3-162952, 3GPP TSG-RAN WG3 Meeting #94 Reno, Nevada, USA, Nov. 14-18, 2016, 20 pages.

Huawei, "Interim agreement on HO and TAU principles," S2-166674, SA WG2 Temporary Document, 3GPP SA WG2 Meeting #118, Reno, Nevada, USA, Nov. 14-18, 2016, 7 pages.

Samsung, "NG2-based Handover procedure," S2-166742 (revision of 5803), SA WG2 Temporary Document, 3GPP SA WG2 Meeting #118, Reno, Nevada, USA, Nov. 14-18, 2016, 14 pages.

Communication pursuant to Article 94(3) EPC in connection with European Application No. 18735839.5 dated Jan. 15, 2021, 7 pages.

Grant of Patent in connection with Korean Application No. 10-2019-7019666 dated Jan. 25, 2021, 7 pages.

First Office Action in connection with Chinese Application No. 201880006109.2 dated Jan. 6, 2021, 18 pages.

European Patent Office, Communication pursuant to Article 94(3) EPC regarding Application No. 18735839.5, dated May 20, 2021, 7 pages.

Extended European Search Report regarding Application No. 18735839.5, dated Dec. 13, 2019, 12 pages.

Samsung et al., "Interim agreement for handover", SA WG2 Meeting #118, S2-167180, Nov. 2016, 2 pages.

Samsung, "Intra-RAT: Xn based handover procedures", SA WG2 Meeting #118Bis, S2-170352, Jan. 2016, 3 pages.

Samsung, "TS 23.502: Xn based NG RAN handover procedures", SA WG2 Meeting #119, S2-171028, Feb. 2017, 3 pages.

Samsung et al., "TS 23.502: Xn based inter NG RAN handover procedures", SA WG2 Meeting #119, S2-171569, Feb. 2017, 4 pages.

European Patent Office, Summons to attend oral proceedings pursuant to Rule 115(1) EPC, dated Oct. 15, 2021 regarding Application No. 18735839.5, 7 pages.

* cited by examiner

NMM State Transition at UE and AMF

NCM State Transition at UE and AMF

INTRA-RAT HANDOVER FOR NEXT GENERATION SYSTEM

CROSS-REFERENCE TO RELATED APPLICATIONS AND CLAIM OF PRIORITY

The present application claims priority to U.S. Provisional Patent Application Ser. No. 62/443,344, filed on Jan. 6, 2017; U.S. Provisional Patent Application Ser. No. 62/443,868, filed on Jan. 9, 2017; U.S. Provisional Patent Application Ser. No. 62/445,074, filed on Jan. 11, 2017; U.S. Provisional Patent Application Ser. No. 62/455,638, filed on Feb. 7, 2017; and U.S. Provisional Patent Application Ser. No. 62/455,629, filed on Feb. 7, 2017. The content of the above-identified patent document is incorporated herein by reference.

TECHNICAL FIELD

The present application relates generally to mobility management operation for next generation system. More specifically, this disclosure relates to mobility, connection, and session management for next generation systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. Existing cellular networks were not designed for supporting Internet of Things (IoT). LTE has been designed from grounds up to provide efficient mobile broadband data communications. One of the important requirement supported LTE, UMTS/HSPA and GSM/GPRS is to support full mobility. Due to this requirement, the mobile is required to be paged in larger location area anytime it goes to idle mode and receives terminating packets from the network. Next generation wireless standards (e.g., 3GPP SA2) started working on the architecture standards. User management is a critical piece of this work. This includes how user plane is selected by the control plane, how it is managed throughout the session, impact on the user plane when multiple user planes are used for the same session etc. It includes details involving creation, modification and release of the user plane. Modification involves mainly relocation of the UPF itself and also relocation of the different functions of the UPF when multiple UPFs are used for traffic transmission to same or different data networks.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, an access and mobility function (AMF) for state management in a wireless communication system is provided. The AMF comprises a processor configured to determine a state of at least one state machine, and a transceiver configured to receive, from a target access network (AN), an N2 path switch request message based on the state of the at least one state machine transmit, to a session management function (SMF), an N11 message; and transmit, to the target AN, an N2 path switch request acknowledgement (Ack) message when receiving an N11 Ack message, from the SMF, corresponding to the N11 message, wherein the target AN transmits a release resource message to a source AN when the target AN receives the N2 path switch request Ack message.

In another embodiment, a method of an access and mobility function (AMF) for state management in a wireless communication system is provided. The method comprises determining a state of at least one state machine, receiving, from a target access network (AN), an N2 path switch request message based on the state of the at least one state machine, transmitting, to a session management function (SMF), an N11 message, transmitting, to the target AN, an N2 path switch request acknowledgement (Ack) message when receiving an N11 Ack message, from the SMF, corresponding to the N11 message, wherein the target AN transmits a release resource message to a source AN when the target AN receives the N2 path switch request Ack message.

In yet another embodiment, a non-transitory computer readable medium comprising instructions, that when executed by at least one processor, perform a method is provided. The non-transitory computer readable medium comprises determining a state of at least one state machine, receiving, from a target access network (AN), an N2 path switch request message based on the state of the at least one state machine, transmitting, to a session management function (SMF), an N11 message, and transmitting, to the target AN, an N2 path switch request acknowledgement (Ack) message when receiving an N11 Ack message, from the SMF, corresponding to the N11 message, wherein the target AN transmits a release resource message to a source AN when the target AN receives the N2 path switch request Ack message.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 23.501 v.1.6, "3rd Generation Partnership Project; Technical Specification Group Services and System Aspects; System Architecture for the 5G System," and 3GPP TS 23.502 v.1.3, "3rd Generation Partnership Project; Technical Specification Group Services and System Aspects; Procedures for the 5G System."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
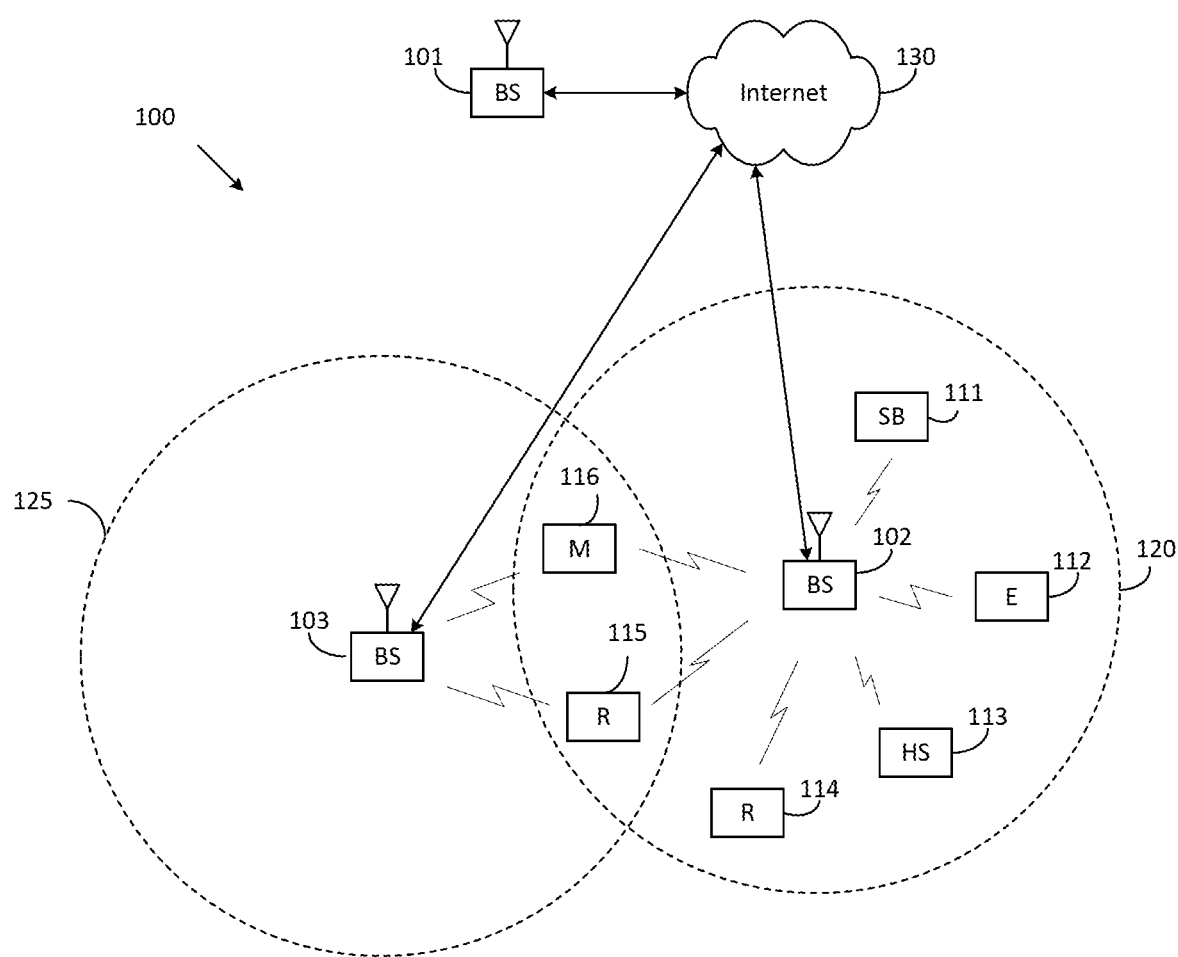
FIG. 1 illustrates an example wireless network according to embodiments of the present disclosure.
Figure 2:
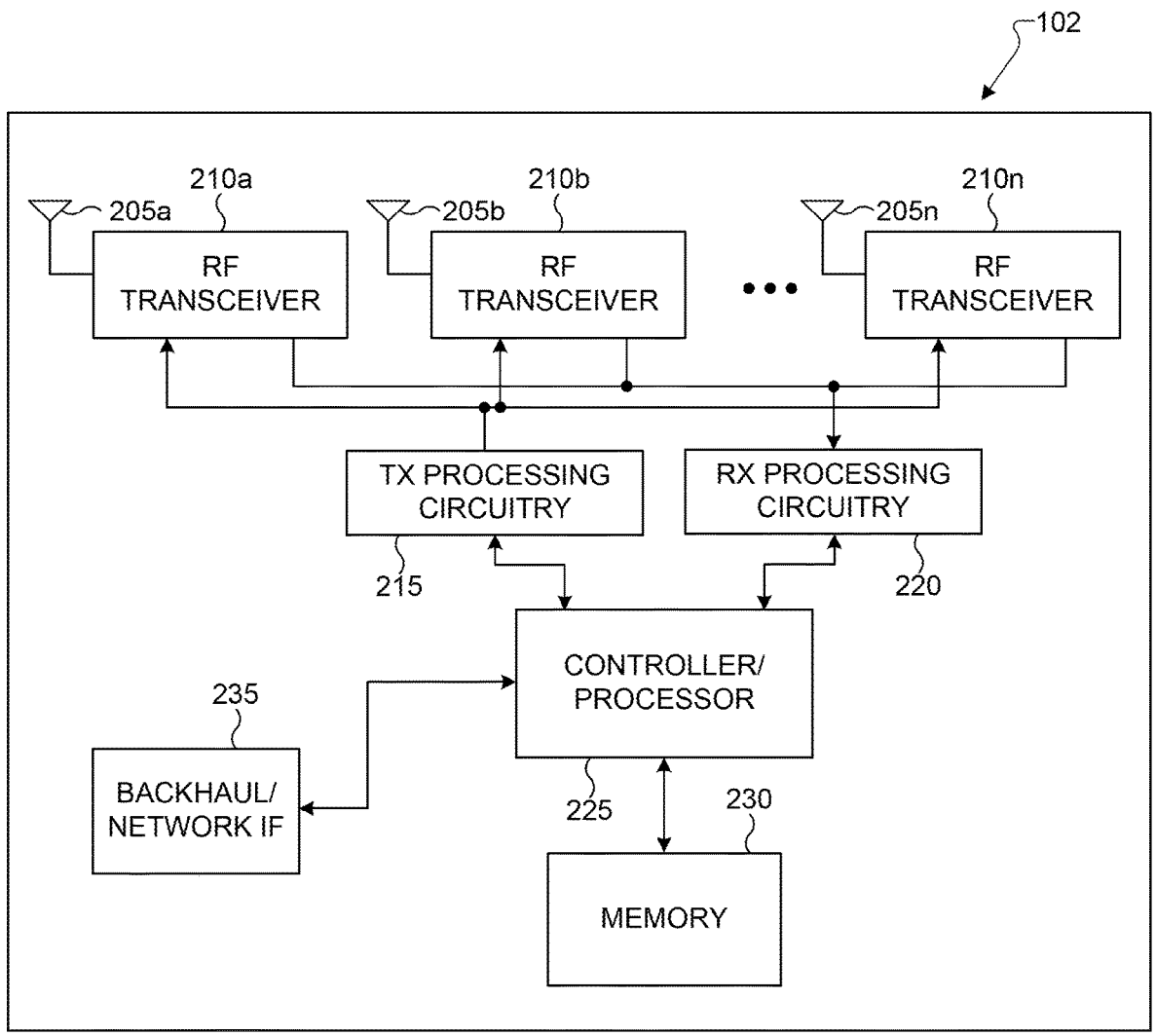
FIG. 2 illustrates an example eNB according to embodiments of the present disclosure.
Figure 3:
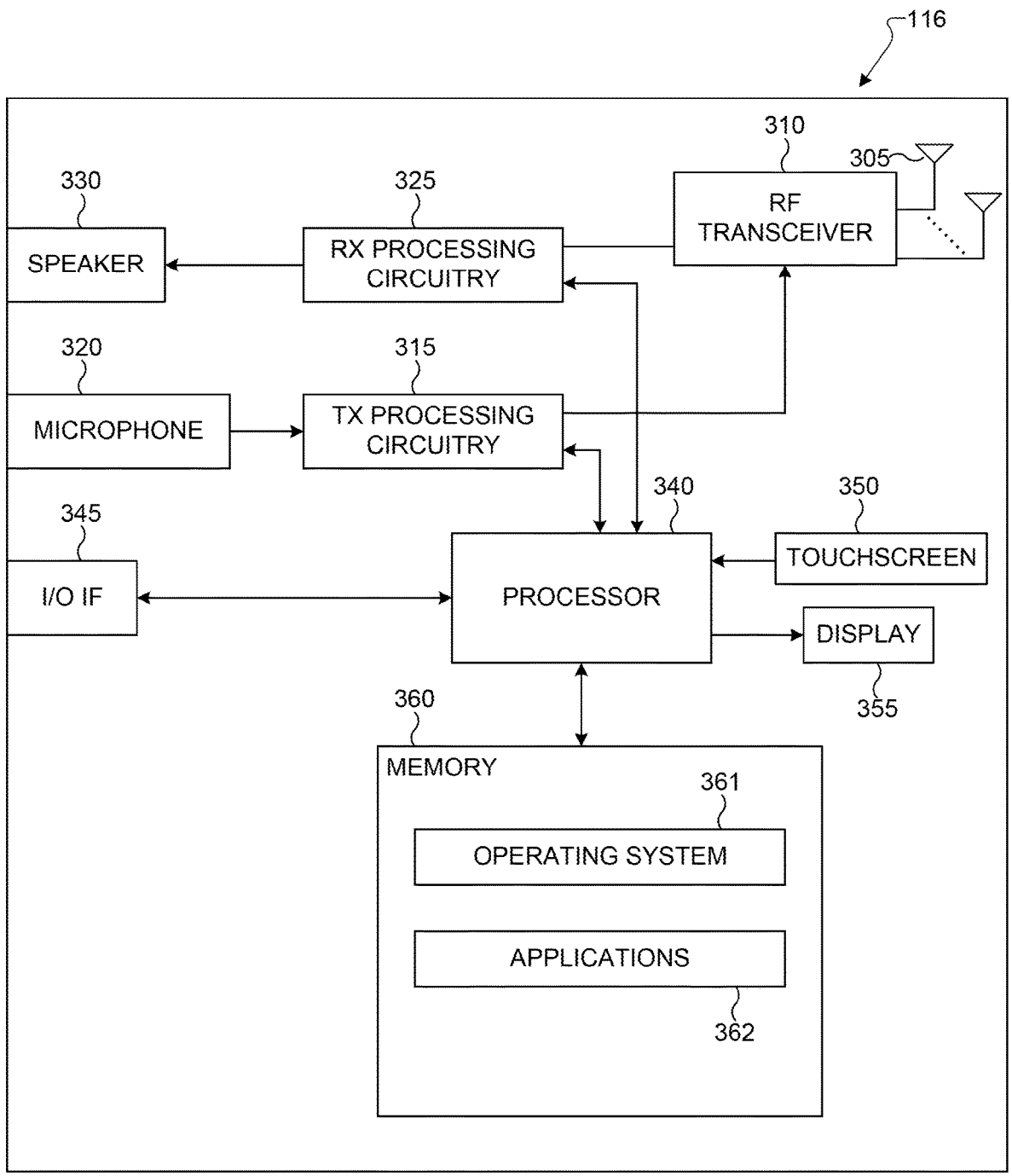
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in the present disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the present disclosure to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient inter-RAT handover operation in advanced wireless communication system. In certain embodiments, and one or more of the eNBs 101-103 includes circuitry, programming, or a combination thereof, for efficient inter-RAT handover operation in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an inter-RAT handover operation and state transition. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Xn interface referred in the present disclosure may a control and user plane interface defined between two gNodeBs (gNBs).

In some embodiments, an Xn based handover without user plane function relocation may be considered. This procedure is used to hand over a UE from a source (radio) access network (R)AN) to target (R)AN using Xn interface when the access and mobility management function (AMF) is unchanged and the session management function (SMF) decides to keep the existing user plane function (UPF). The UPF referred in this clause is the UPF which terminates N3 interface in the 5G next generation core (NGC). The presence of internet protocol (IP) connectivity between the source UPF and target UPF is assumed.

Figure 4:
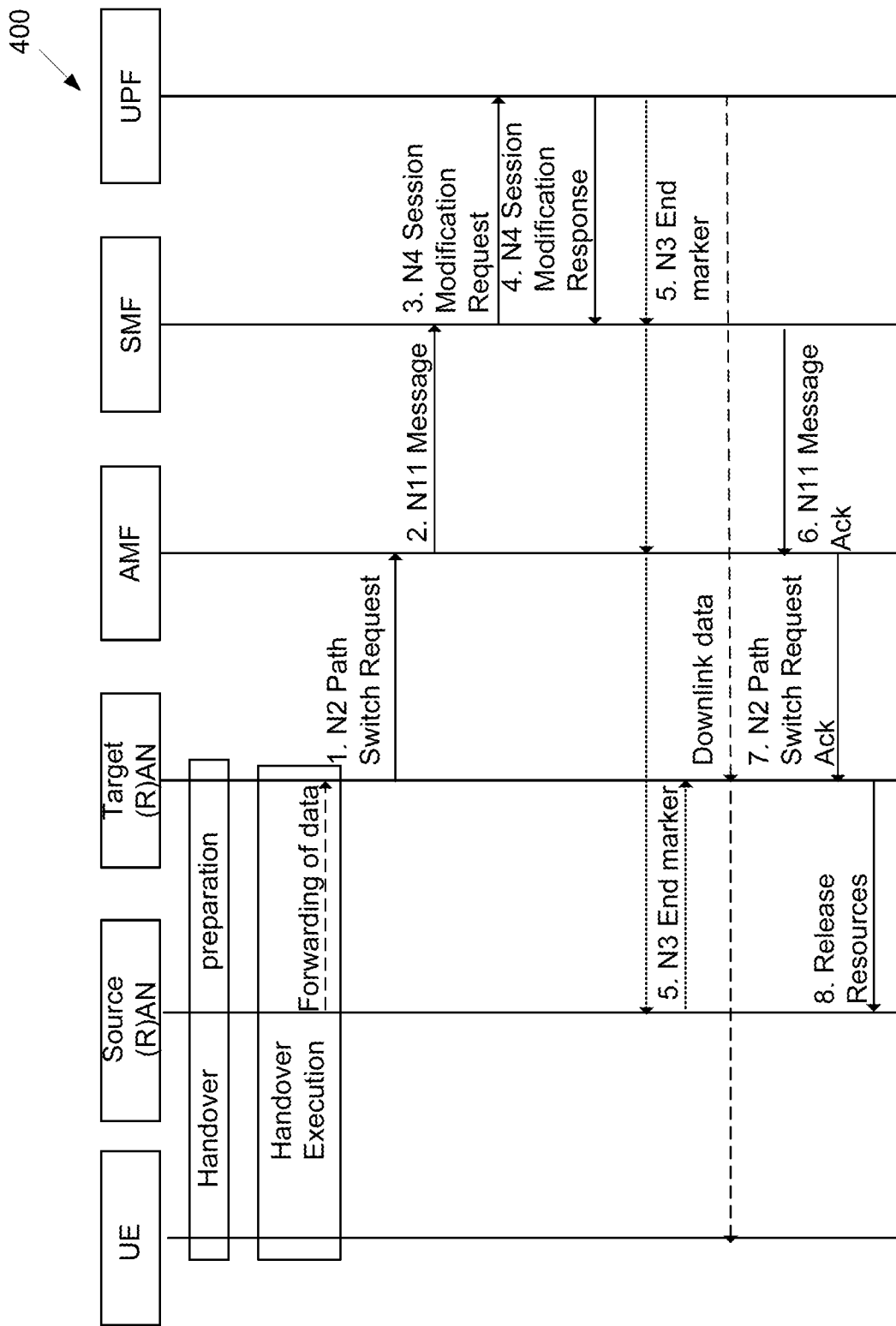
FIG. 4 illustrates an example Xn based handover without UPF relocation according to embodiments of the present disclosure.

FIG. 4 illustrates an example Xn based handover without UPF relocation 400 according to embodiments of the present disclosure. An embodiment of the Xn based handover without UPF relocation 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 4, at step 1, the target (R)AN sends an N2 path switch request message to an AMF to inform that the UE has moved to a new target cell and a list of bearers to be switched. Depending on the type of target cell, the target (R)AN includes appropriate information in this message. At step 2, the AMF sends an N11 message to one or more SMFs currently serving the UE which includes the list of bearers to be switched. At step 3, upon receipt of the N11 message, the SMF determines that the existing UPF can continue to serve the UE. Each SMF maintains the corresponding list of the bearers from the UE context. If some of these bearers are not accepted by the target (R)AN, the SMF initiates release of those bearers at that time. For all accepted bearers, the SMF sends an N4 session modification request ((R)AN address, tunnel identifiers for downlink user plane) message. At step 4, the UPF may return an N4 session modification response (e.g., tunnel identifiers for uplink traffic) message to the SMF. At step 5, in order to assist the reordering function in the target (R)AN, the UPF may send one or more "end marker" packets on the old path immediately after switching the path. The UPF starts sending downlink packets to the target (R)AN. At step 6, this step can occur anytime after receipt of step 4 at the SMF. Each SMF sends an N11 message response (e.g., tunnel identifiers for uplink traffic) to the AMF. At step 7, the AMF aggregates N11 message responses received from SMF(s) along with the list of bearers failed to switch. The AMF confirms the N2 path switch request message by sending N2 path switch request Ack (e.g., UPF address, tunnel identifiers for uplink traffic) message to the target (R)AN. If none of the requested bearers have been switched successfully, the AMF may send an N2 path switch request failure message to the target (R)AN. At step 8, by sending a release resources message to the source (R)AN, the target (R)AN confirms success of the handover. It then triggers the release of resources with the Source (R)AN.

In some embodiments, an Xn based handover with user plane function relocation may be considered. This procedure is used to hand over a UE from a source (R)AN to a target (R)AN using Xn when the AMF and SMF are unchanged and the SMF decides that the source UPF is to be located. The source UPF referred in this clause is the UPF which terminates N3 interface in the NGC. The presence of IP connectivity between the source UPF and Source (R)AN, and between the target UPF and target (R)AN, is assumed.

Figure 5:
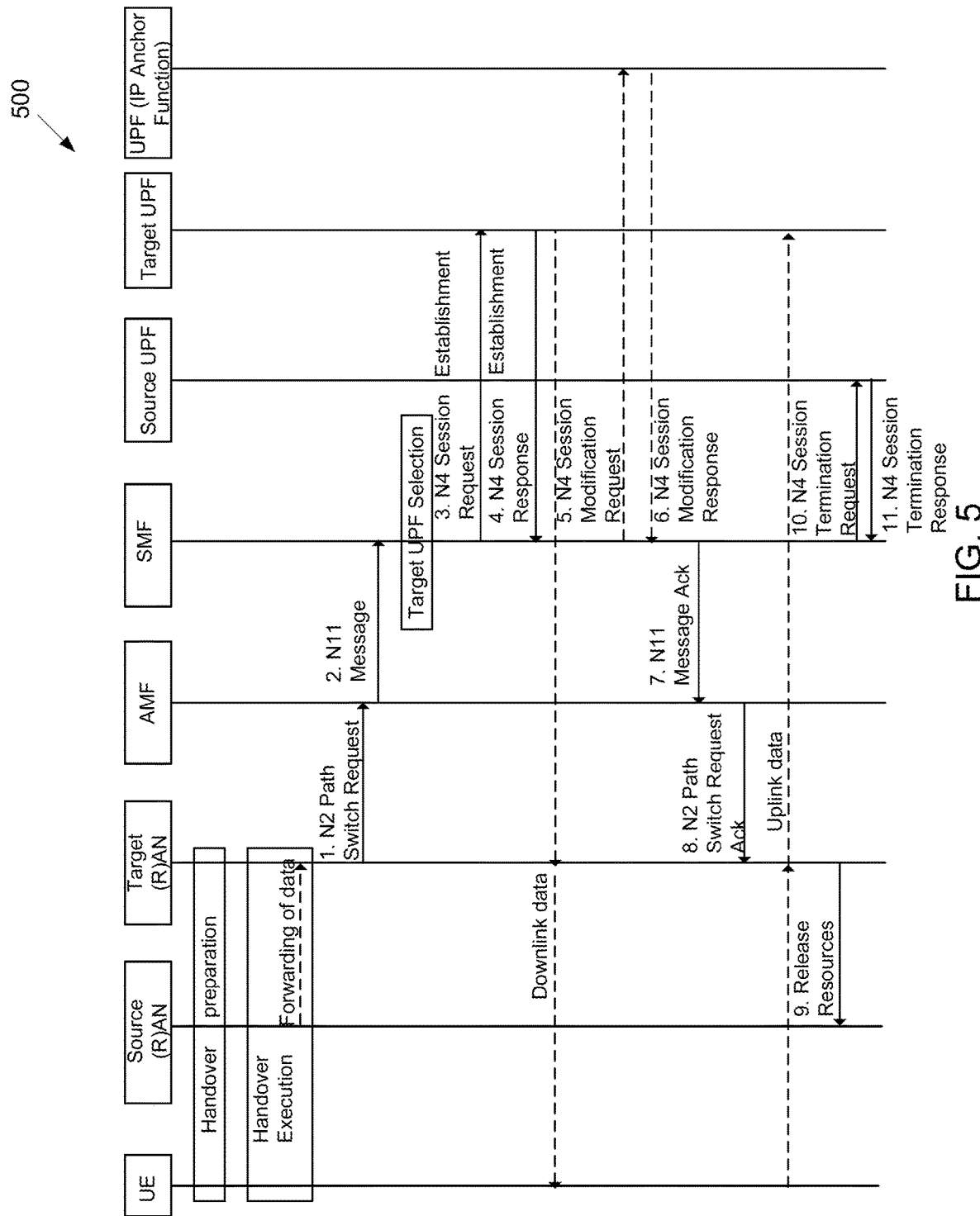
FIG. 5 illustrates an example Xn based handover with UPF relocation according to embodiments of the present disclosure.

FIG. 5 illustrates an example Xn based handover with UPF relocation 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 5, the steps 1 and 2 are the same as discussed in the aforementioned embodiment (e.g., Xn based handover without user plane function relocation) of the present disclosure. As illustrated in FIG. 5, at step 3, the SMF determines that the source UPF needs to be relocated based on UPF selection criteria and selects a new target UPF. Each SMF maintains the corresponding list of the bearers from the UE contexts. If some of these bearers are not accepted by the target (R)AN, the SMF initiates release of those bearers at that time. All accepted bearers are included in an N4 session establishment request message sent to the target UPF. Target UPF IP address assignment, and allocation of downlink and uplink tunnel identifiers are performed by the SMF. An N4 session establishment request (e.g., target (R)AN address, uplink and downlink tunnel identifiers) message is sent to the target UPF. At step 4, the target UPF sends an N4 session establishment response message to the SMF. The SMF starts a timer, to be used in step 10. At this point, the target UPF starts sending downlink packets to the target (R)AN using the newly received address and tunnel identifiers. At step 5, if the PDU session anchor function is not collocated with the target UPF, the SMF may initiate N4 session modification procedure with the UPF having PDU session anchor function. At step 6, the UPF having PDU session anchor function responds with the N4 session modification response. At step 7, each SMF sends a N11 message response (e.g., target (R)AN address, tunnel identifiers for uplink traffic) to the AMF. At step 8, the AMF aggregates N11 message responses received from SMF(s) along with the list of bearers failed to switch. The AMF confirms the N2 path switch request message with the N2 path switch request Ack (e.g., target UPF address, tunnel identifiers for uplink traffic) message. If none of the requested bearers have been switched successfully. In this case, the AMF may send an N2 path switch request failure message to the target (R)AN. At step 9, by sending a release resources message to the source (R)AN, the target (R)AN confirms success of the handover and triggers the release of resources with the source (R)AN. At step 10, once the timer has expired after step 4, the SMF initiates source UPF release procedure by sending an N4 session termination request (release cause). At step 11, the source UPF acknowledges with an N4 session termination response message to confirm the release of resources.

The NextGen session management (NSM) describes the signaling and bearer connectivity between the UE and the NextGen core network (CN), i.e. signaling connectivity with the SMF (N2) and bearer connectivity with the UPF (N3). In general, the NSM and NextGen mobility management (NMM) and NextGen connection management (NCM) states are independent of each other.

The NSM states are supported independently of the access network technology the UE may be using. These states are maintained at the UE. The following three states are defined for connectivity to a data networks(s), regardless of the number of PDU sessions the UE has established to a given data network: NSM-IDLE; NSM-READY; and NSM-CONNECTED A UE is in NSM-IDLE state when there is no signaling connection exist between the UE and NextGen CN and also there is no UE context available at the NextGen access network. The RRC connection has not been established at that time and hence the UE remains in RRC-IDLE state.

A UE is in NSM-READY state when there is a signaling connection exist (N1 and N2) between the UE and NextGen CN but there is no PDU session exist at that time. The UE context is also available at the NextGen Access Network. The RRC connection has not been established at that time and hence the UE remains in RRC-IDLE state.

For a UE in the NSM-CONNECTED state, there exists a signaling connection and at least one bearer connection between the UE and the NextGen CN. Since N2 terminates at the AMF, messages intended for the SMF are terminated via AMF to the SMF. In this state, the location of the UE is known and the mobility of the UE is handled by the handover procedure and tracking area update procedures. There may be at least one session exist between the UE and NextGen CN. The RRC state may be RRC-CONNECTED at that time for all active PDU sessions while it is RRC-INACTIVE for all inactive PDU sessions.

The UE may enter the NSM-IDLE state when the last PDU session or (a default PDU session in case if PDU session was established along with Attach procedure) to the SMF is released or broken. This release or failure is explicitly indicated by the access node to the UE or detected by the UE.

Figure 6:
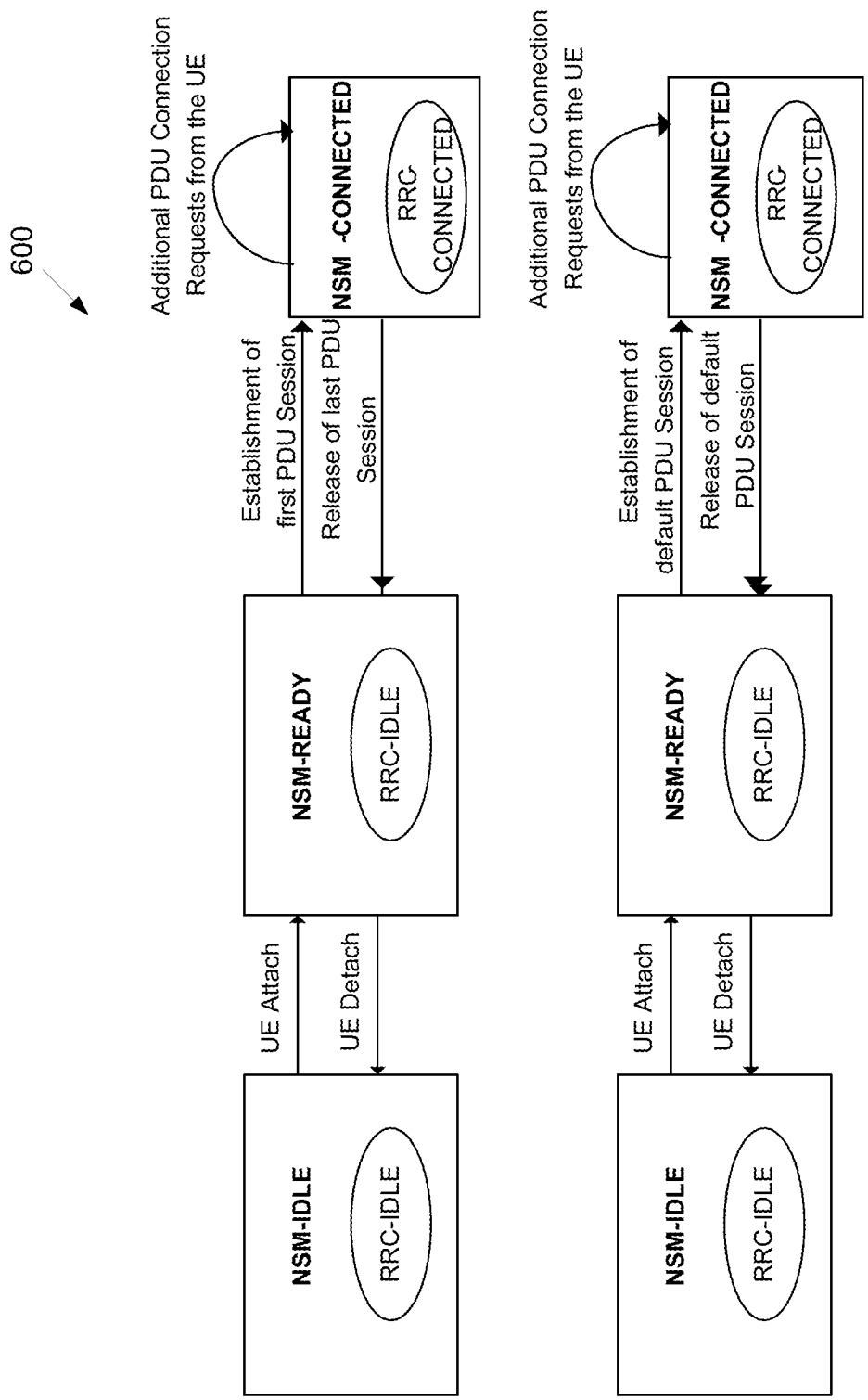
FIG. 6 illustrates an example NSM state transition at UE according to embodiments of the present disclosure.

FIG. 6 illustrates an example NSM state transition 600 at UE according to embodiments of the present disclosure. An embodiment of the NSM state transition 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

The NSM state transitions from NSM-IDLE to NSM-CONNECTED at the UE may occur once it establishes a PDU session. The RRC connection is established at that time. The NSM state remains NSM-CONNECTED for request of additional PDU sessions at both UE and the SMF. Once the last PDU session is release, the NSM state may transition to NSM-IDLE at the UE.

There may be some special cases where the UE requests the PDU session establishment at the same time as the attach. At that time also the UE state may transit to NSM-CONNECTED from NSM-IDLE and remain connected in case if additional PDU sessions are requested. The release of the default PDU session may transit to the NSM state at UE.

The NMM states describe the mobility management states that result from the mobility management procedures such as attach and tracking area update procedures. These states are maintained at the UE and also at the AMF in the NextGen CN. The following are the two states considered in the present disclosure. In one example of EMM-DEREGISTERED state, the NMM context in AMF holds no valid location or routing information for the UE. The UE is not reachable by an AMF, as the UE location is not known. Some UE context mainly related to security can still be stored in the UE and AMF. In another example of EMM-REGISTERED state, the UE location is known in the AMF to at least an accuracy of the tracking area list allocated to that UE. The UE also has security context set with the N1 and N2 signaling connectivity available with the AMF.

Figure 7:
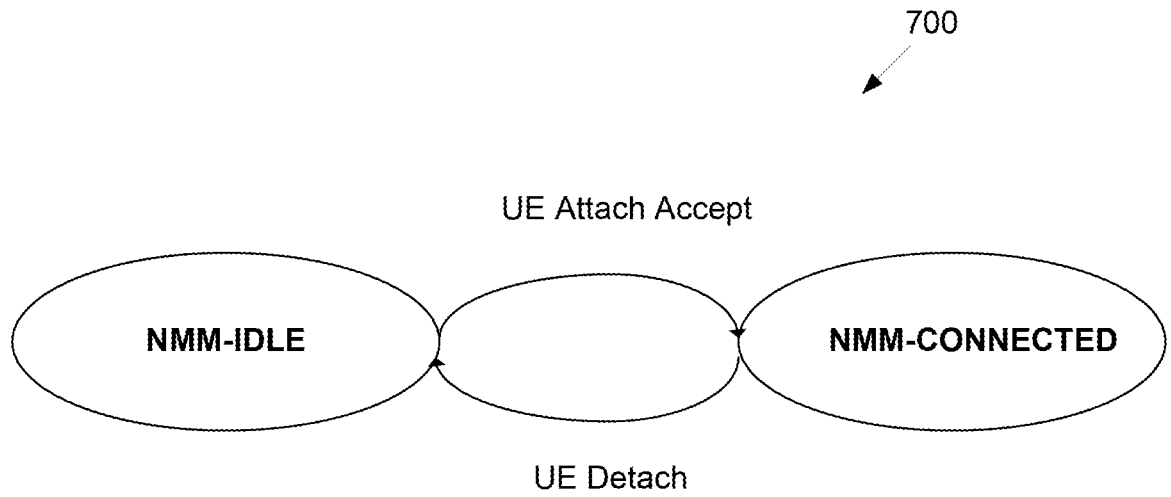
FIG. 7 illustrates an example NMM state transition according to embodiments of the present disclosure.

FIG. 7 illustrates an example NMM state transition 700 according to embodiments of the present disclosure. An embodiment of the NMM state transition 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

The UE and AMF may enter in the NMM-REGISTERED state completion of attach procedure or tracking area update and they may enter in the NMM-IDLE state once UE is detached. At that time, the AN may clean the UE context for that UE.

The NCM states describe the signaling connectivity between the UE and the NextGen CN. These states are maintained at the UE and the AMF. There are two ECM states described in the present disclosures. In one example of ECM-IDLE, there is no signaling connection between UE and NextGen CN exists, i.e. no N1 and N2 connections. Also, there exists no UE context in the access network (AN) for the UE in the ECM-IDLE state. In yet another example of ECM-CONNECTED, signaling connectivity between UE and NextGen exists from the UE and AMF perspective. RRC connection may not be established and hence UE may remain in the RRC-IDLE state. Although these is no N11 connectivity exist between the AMF and the SMF(s) and also may not have N3 connectivity between the AN and UPF for that UE.

Figure 8:
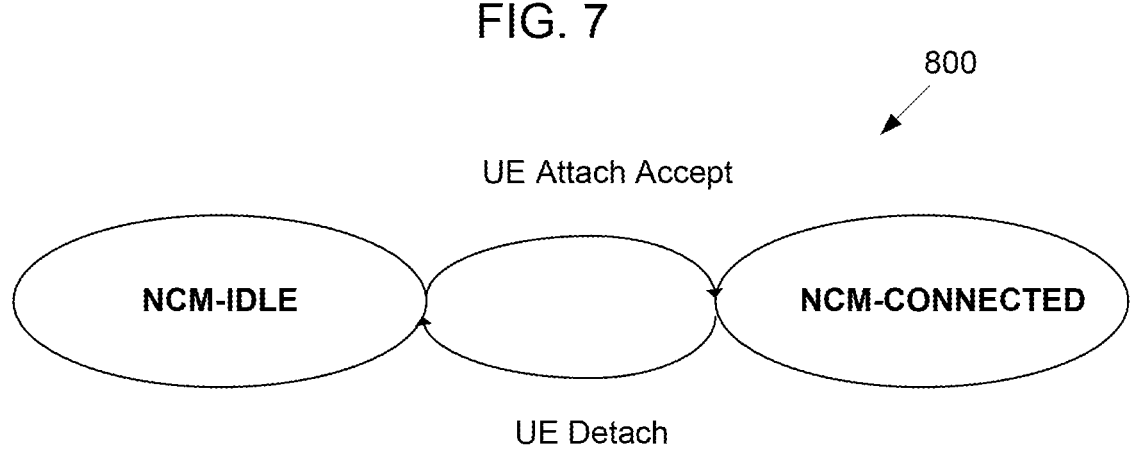
FIG. 8 illustrates an example NCM state transition according to embodiments of the present disclosure

FIG. 8 illustrates an example NCM state transition 800 according to embodiments of the present disclosure. An embodiment of the NCM state transition 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

The UE and AMF may enter in the NCM-CONNECTED state completion of attach procedure and they may enter in the NCM-IDLE state once UE is detached. At that time, the AN may clean the UE context for that UE.

The NMM states are maintained at the UE and at the AMF in the NextGen CN. Similarly, the NSM states are maintained at the UE and at the AMF in NextGen CN. The relationship between the NSM states and the mobility management states is defined in such a way that the NSM states apply to any access network (AN) connected to the NextGen CN, including scenarios in which the UE supports no mobility.

Figure 9:
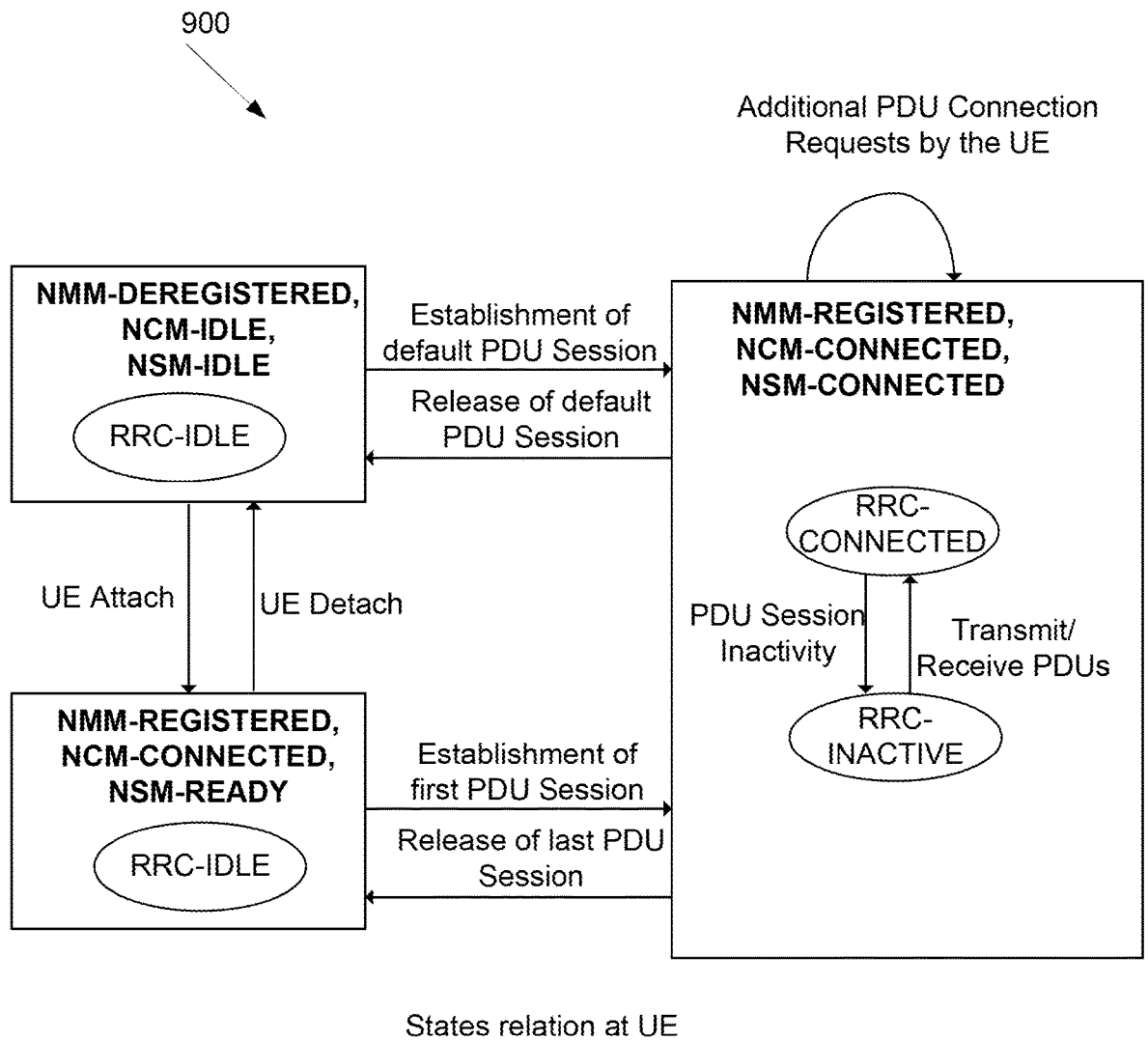
FIG. 9 illustrates an example relation between NSM, NCM, and NMM states at the UE according to embodiments of the present disclosure.

FIG. 9 illustrates an example relation between NSM, NCM and NMM states 900 at the UE according to embodiments of the present disclosure. An embodiment of the relation between NSM, NCM and NMM states 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

The relation between the NSM states, NCM states and NMM states which are maintained by the UE is shown in FIG. 9. In one example of NMM-DEREGISTERED, NCM-IDLE, and NSM-IDLE, the UE may not be powered on or not attached to the NextGen CN. In this state, the AMF does not hold valid location or routing information for the UE and hence UE is not reachable. There is no signaling connection exists between the UE and the AMF/SMF.

In another example of NMM-REGISTERED, NCM-CONNECTED, and NSM-READY, the UE may enter the NMM-REGISTERED state by a successful registration with an Attach procedure. At that time, the RRC state at the UE may still remain RRC-IDLE. The NextGen access network preserves the context of the UE. There is a signaling connections (N1 and N2) exists between the UE and the NextGen CN but there is no bearer connection exist (N3) since there is no active PDU session established at that time. In yet another example of NMM-REGISTERED, NCM-CONNECTED, and NSM-CONNECTED, the UE is connected to the NextGen CN by establishing signaling and bearer connections. There are one or multiple PDU sessions being processed by the SMF. The RRC state may be RRC-CONNECTED if the PDU session is active at that time. Otherwise, the RRC state may be RRC-INACTIVE.

Figure 10:
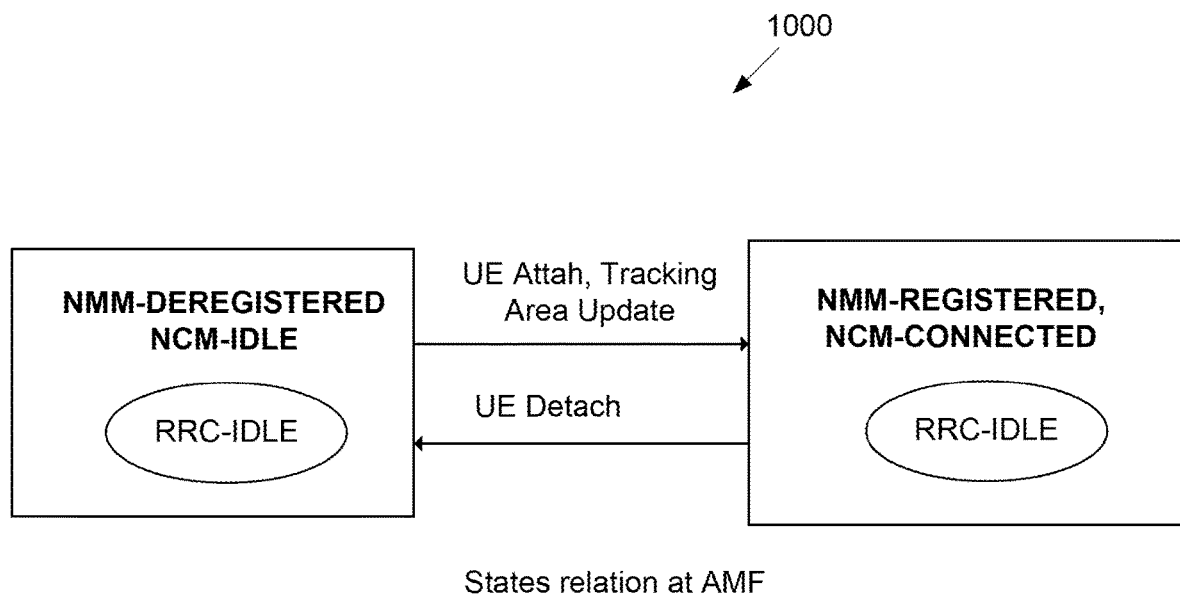
FIG. 10 illustrates an example relation between NSM, NCM, and NMM states at the AMF according to embodiments of the present disclosure.

FIG. 10 illustrates an example relation between NSM, NCM and NMM states 1000 at the AMF according to embodiments of the present disclosure. An embodiment of the relation between NSM, NCM and NMM states 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

The relation between the NMM states and NCM states which are maintained by the AMF is shown in FIG. 10. In one example of NMM-DEREGISTERED and NCM-IDLE state, the AMF does not hold valid location or routing information for the UE and hence UE is not reachable. There is no signaling connection exists between the UE and the AMF. In another example of NMM-REGISTERED and NCM-CONNECTED state, the AMF enters the NMM-REGISTERED state by processing tracking area update procedure or an Attach procedure via NextGen access network. In this state, UE becomes reachable from the AMF perspective through the signaling connectivity.

The user plane function (UPF) selection may be performed by the session management function (SMF) during the session establishment or when UPF relocation is required. The selection may be done based on per PDU session granularity where there is one tunnel per PDU session between access node (AN) and UPF in NextGen core network (CN) and between UPFs. All QoS classes of a session share the same outer IP header, but the encapsulation header identifies the PDU session and may carry QoS markings.

NextGen CN includes support of multi-homing UEs also support multiple connection to the same or different data networks for supporting local services and external services. From the routing perspective, the following functions defined which may coexist with the UPF. In one example of uplink classifier function, uplink classifier function (UCF) normally resides at the UPF which serves as an N3 termination point. It allows steering of local traffic and external traffic to their respective networks. It applies operator defined filtering rules and determines routing of the packets. The support of UCF is optional, but necessary if the operator supports traffic to the local network. The operator may use configuration or policies to determine which packet flows are to be routed to/from the local network. Such configuration or policies are applied using uplink classification based on IP-5-tuple filtering rules. For downlink, the operator configures the network routing such that only legitimate traffic from the local server may pass via the UPF local IP point of presence.

In another example of IP anchoring function, IP anchoring function (IAF) is a part of UPF that provides access to the external services and locates in the more central location. It is responsible for UE IP address management. The support of the IAF is mandatory. In yet another example of branching function, a branching function (BF) is enabled for supporting multi-path/multi-homing PDU connections. It enables traffic from the UE to be split via multiple paths through multiple UPFs in the uplink direction. Similarly in the downlink direction, incoming traffic from multiple UPFs, is aggregated by this function prior to transmitting to the UE. This is a logical functional entity generally collocated with the UPF which is an N3 termination point in order to support multi-path/multi-homing transmission capability.

Figure 11:
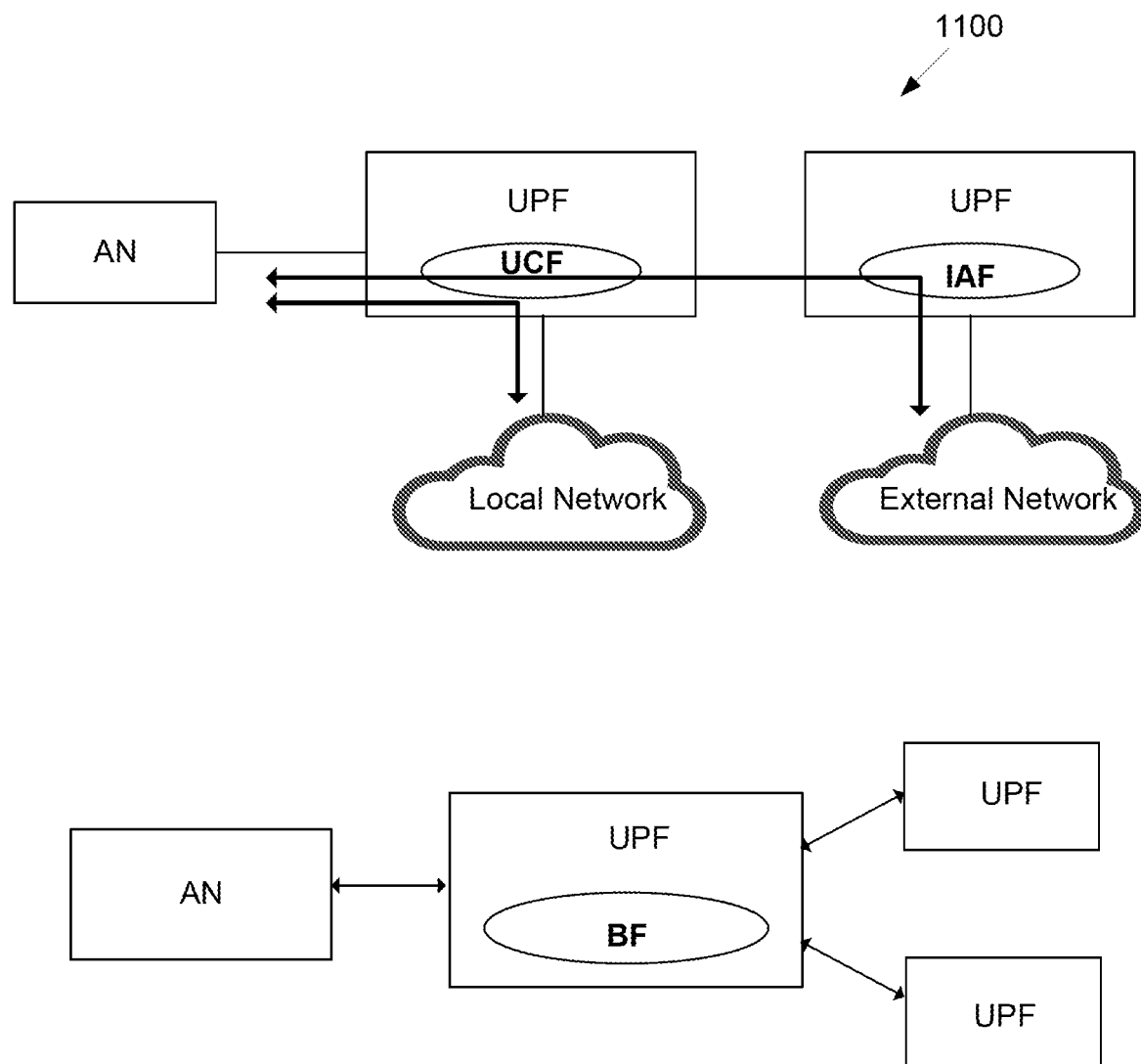
FIG. 11 illustrates an example user plane connectivity according to embodiments of the present disclosure.

FIG. 11 illustrates an example user plane connectivity 1100 according to embodiments of the present disclosure. An embodiment of the user plane connectivity 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

Only one host IP address that is centrally anchored may be assigned to the UE. The UCF with the local IP point of presence examines destination IP address and decides whether to transmit the PDU within a tunnel to the external IP anchor or it may be transmitted to the local network.

The UE IP address management includes allocation and release of the UE IP address as well as renewal of the allocated IP address, where applicable. The UE IP address management may be performed by the SMF. The SMF may process the UE IP address management related messages, maintain the corresponding state information and provide the response messages to the UE. In case the UE IP address is obtained from the external DNN, additionally, the SMF may also send the allocation, renewal and release related request messages to the external DNN and maintain the corresponding state information. The IAF may support forwarding of the UE IP address management related messages to the SMF, when they are received via the user plane signaling from the UE or from the external PDN.

When SMF performs IPv4 address allocation via default bearer activation and release via PDN connection release, no special functionality is required from the IAF. For the other UE IP address management mechanisms, the UE sends the IP address management related request messages via the user plane signaling. Hence the IAF is required to forward these request messages to the SMF for processing. Once these request messages are processed by the SMF, the SMF sends response messages to the UE via the user plane signaling. Hence the SMF is required to forward these response messages to the IAF so that it can be relayed it to the UE. Correspondingly, following functionality is required to be supported by the SMF and IAF.

In one example, for IPv6 default prefix management via IPv6 stateless address auto-configuration, the SMF may configure IAF to forward router solicitation and neighbor solicitation messages from the UE to the SMF. The SMF may forward router advertisement and neighbor advertisement messages to the IAF for relaying them to the UE.

In another example, for IPv6 parameter configuration via stateless DHCPv6, the SMF may configure IAF to forward all the DHCPv6 messages from the UE to the SMF. The SMF may forward the DHCPv6 response messages to the IAF for relaying them to the UE.

In yet another example, for IPv4 address management and parameter configuration DHCPv4, the SMF may configure IAF to forward all the DHCPv4 messages from the UE to the SMF. The SMF may forward the DHCPv4 response messages to IAF for relaying them to the UE.

In yet another example, for IPv6 prefix management via IPv6 prefix delegation, the SMF may configure IAF to forward all the DHCPv6 messages from the UE to the SMF. The SMF may forward the DHCPv6 response messages to IAF for relaying them to the UE.

The selection of the UPF is performed by the SMF by considering UPF deployment scenarios such as centrally located UPF and distributed UPF located close to or at the access network site. The selection of the UPF may also enable deployment of UPF with different capabilities, e.g. UPFs supporting no or a subset of optional functionalities. The UPFs capabilities may be signaled during the initial connection establishment between the SMF and the UPF. The SMF may be made dynamically aware on the UPF load and relative static capacity for which it has an established N4 session.

The exact set of parameters used for the selection mechanism is deployment specific and controlled by the operator configuration, e.g. location information may be used for selecting UPF in some deployments while may not be used in other deployments. For UPF selection, the SMF may be able to consider the following parameters. In one example, the UPF's dynamic load is considered at the node level. In such example, the SMF may then derive the load at the APN level. In another example, the UPF's relative static capacity among UPFs supporting the same APN is considered. In yet another example, the UPF location available at the SMF is considered. In such example, the UPF selection function uses these parameters based on SMF configuration to select a UPF close to the UE's point of attachment. In yet another example, the capability of the UPF and the functionality required for the particular UE session is considered. In yet another example, an appropriate UPF can be selected by matching the functionality and features required for an UE (which can be derived from the information such as APN, mapped UE Usage Type, UE location information) or from the policy function (e.g. need to perform DPI)) with the capabilities of the UPF so as to fulfil the service for the UE. In yet another example, to enable APN-AMBR enforcement, whether a PDN connection already exists for the same UE and APN, in which case the same UPF may be selected.

One of the main tasks of the N4 interface is to enable the SMF to instruct the UPF about how to forward user data traffic. The following user plane forwarding scenarios are supported. In one example, forwarding of user-plane between UE and DDN is supported, including mapping of tunneling between AN and UPF and between UPFs. In another example, forwarding of user-plane packets from UE and SMF via UPF is supported. In such example, similarly, forwarding of packets from the external DDN and the SMF is supported. Example includes packets related to DHCPv4/v6, traffic subject to HTTP redirect etc. In yet another example, forwarding of packets subject to buffering in the SMF is supported.

The SMF controls user-plane packet forwarding by providing traffic handling instructions to the UPF. The traffic handling instructions include: packet detection information; and forwarding target and operation information.

The packet detection information includes information which allows the UPF to identify the traffic that is subject to the forwarding treatment described by the forwarding target. The information may allow detection on L3, L4, L7/application, bearer and DDN connection level. The forwarding target and operation describes how the UPF may treat a packet that matches the packet detection information. The details of the forwarding target and operation may depend on the scenario. The following forwarding functionality is required by the UPF: apply encapsulation, de-capsulation or both; forward the traffic to the SMF; and apply locally configured policy for traffic steering.

For forwarding between the SMF and UPF, the user plane packet is forwarded outside of the control protocol over N4 by encapsulating the user-plane packet using a UP encapsulation protocol that allows the receiving entity to identify which DDN Connection and possibly which bearer the traffic belongs to.

In the direction from the SMF to UPF for forwarding towards the UE or DDN, the UP encapsulation protocol also may contain information that allows the UPF to identify whether the UE or DDN is targeted. This applies in the same way for traffic from the SMF to the UPF as well as for traffic from the UPF to the SMF.

Buffering of the UE's data packets for the UE in idle or power saving mode is performed in SMF on a per UE session basis. When the UE moves to NCM-IDLE state, if the SMF decides to activate buffering, it may inform the UPF to stop sending data packets to the AN and start forwarding the downlink data packets towards the SMF. When the UE transits to the NCM-CONNECTED state, the SMF may update the UPF via N4 interface with tunnel specific parameters. If there are buffered packets available and their buffering duration has not expired, the SMF may forward those packets to the UPF outside of the control plane signaling to relay them to the UE. These packets are then forwarded by the UPF to the AN.

N4 connectivity between the SMF and the UPF may exist prior to initiation of the N4 session establishment procedure. As a part of PDU session establishment, the UPF stores the N4 session context based on the information provided by the SMF. This N4 session context comprises of parameters required for managing bearers at the UPF. The SMF may modify the N4 Session Context during the PDU session and later release it once the PDU session is released.

N4 session management procedures are used to control the functionality of the UPF for a specific PDU session. N4 connectivity between the SMF and the UPF may exist prior to initiation of the N4 session establishment procedure. N4 session management procedures include N4 session establishment procedure, N4 session modification procedure and N4 session termination procedure. All of these procedures are initiated by the SMF.

The following parameters are exchanged over the N4 interface between the SMF and UPF. This is not an exhaustive list but includes majority of the parameters needed to control different actions needed at the UPF; a session id; precedence (can be overall or per rule basis); buffering start/stop notification; packet detection rule (e.g., data network instance id, interface direction, UE IP address, local tunnel identifier and UPF address, SDF filter and application id); usage reporting rule (e.g., measurement key, reporting triggers, periodic measurement threshold, volume measurement threshold, time measurement threshold, event measurement threshold, Inactivity detection time and Event based reporting); forwarding action rule; reporting rule (e.g., measurement key, reporting triggers, start time, end time, measurement information, time of last packet); and QoS enforcement rule (e.g., QoS enforcement rule correlation identifier, UL/DL gate status, maximum bitrate, guaranteed bitrate, transport level marking, extension header.

During PDU session establishment and UPF relocation procedures, the N4 session establishment procedure is executed between SMF and UPF. This procedure is used to create the initial N4 Session Context for the new PDU session at the UPF. The N4 Session Context comprises the parameters required for managing each bearer of the PDU session at the UPF and it is stored based on the session identifier.

Figure 12:
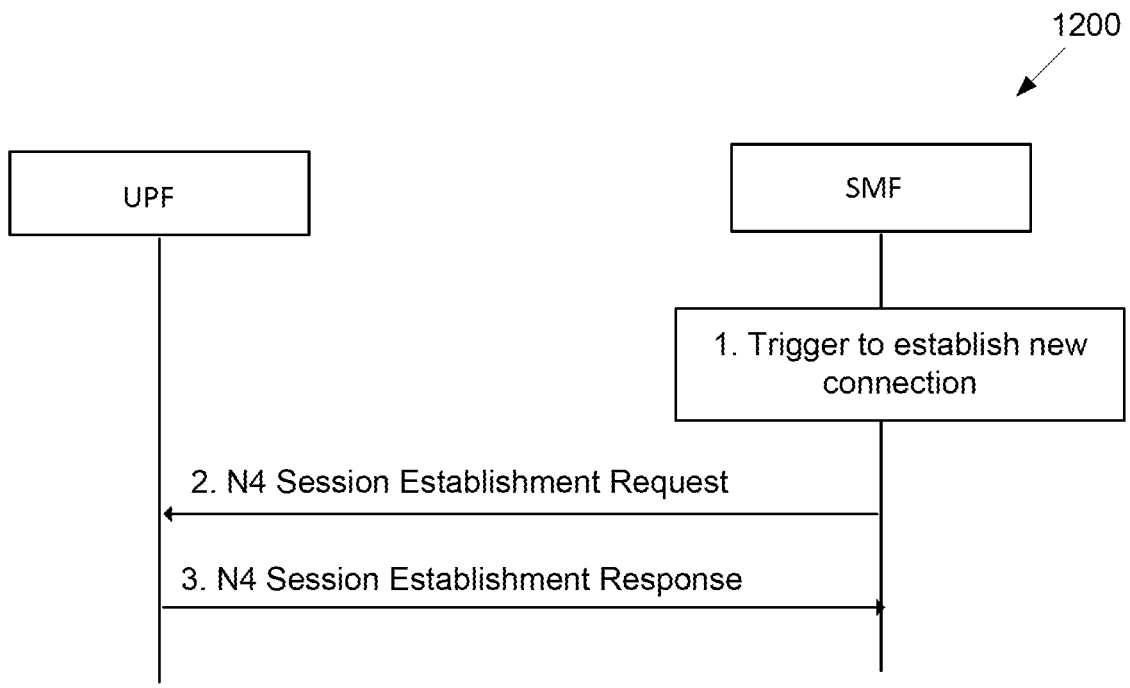
FIG. 12 illustrates an example N4 session establishment procedure according to embodiments of the present disclosure.

FIG. 12 illustrates an example N4 session establishment procedure 1200 according to embodiments of the present disclosure. An embodiment of the N4 session establishment procedure 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, at step 1, an SMF receives the trigger to establish a new connection from a peer network entity. At step 2, the SMF sends an N4 session establishment request message to the UPF that contains parameters/rules instructing actions for the UPF. This includes parameters listed in clause "parameters exchanged over N4" of the present disclosure. At step 3, the UPF creates an N4 Session Context and responds with an N4 session establishment response message containing information that the UPF has to provide to the SMF in response to the information received.

The N4 session modification procedure is used to update the N4 session context of an existing connection of a PDU session at the UPF. The N4 session modification procedure is executed between SMF and UPF whenever parameters/rules related to existing connection of the PDU session have to be modified.

Figure 13:
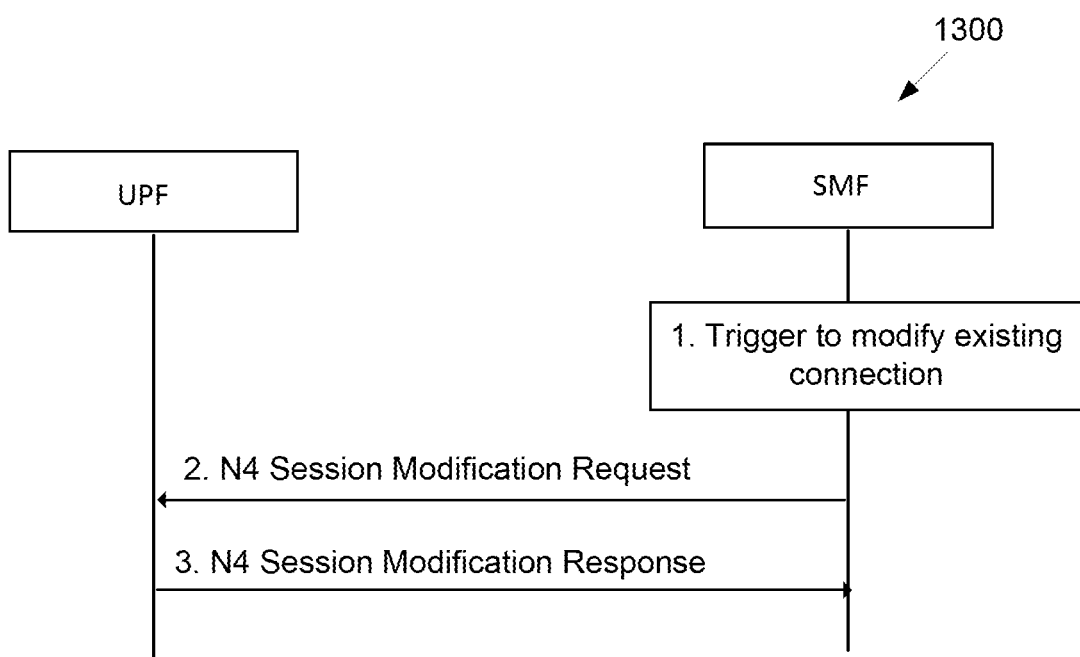
FIG. 13 illustrates an example N4 session modification procedure according to embodiments of the present disclosure.

FIG. 13 illustrates an example N4 session modification procedure 1300 according to embodiments of the present disclosure. An embodiment of the N4 session modification procedure 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As shown in FIG. 13, at step 1, an SMF receives a trigger to modify the existing connection of the PDU session from a peer network entity. At step 2, the SMF sends an N4 session modification request message to the UPF that contains the update for the parameters(s)/rule(s) instructing actions for the UPF. This includes one or more parameters listed in clause "parameters exchanged over N4" of the present disclosure. At step 3, the UPF identifies the N4 Session Context to be modified based on the session identifier. Then, the UPF updates the N4 Session Context according to the information sent by the SMF. The UPF responds with an N4 session modification response message containing information that the UPF has to provide to the SMF.

Figure 14:
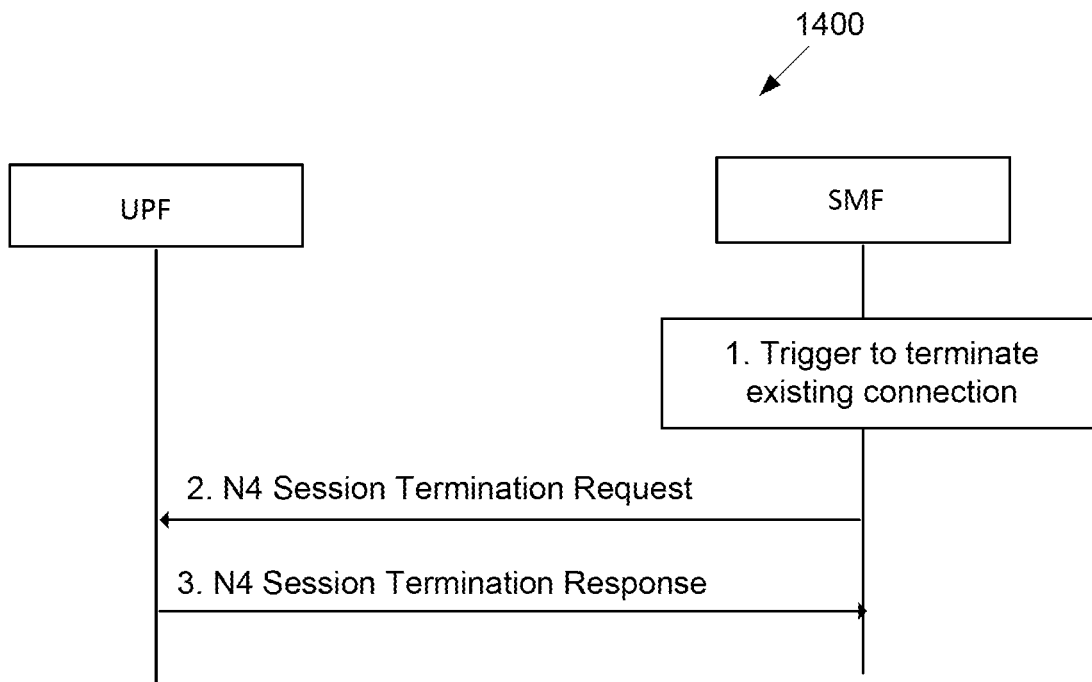
FIG. 14 illustrates an example N4 session termination procedure according to embodiments of the present disclosure.

FIG. 14 illustrates an example N4 session termination procedure 1400 according to embodiments of the present disclosure. An embodiment of the N4 session termination procedure 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

The N4 session termination procedure is illustrated in FIG. 14. It is used to remove the N4 Session Context from the UPF. At step 1, an SMF receives the trigger to terminate the existing connection for a PDU session from a peer network entity. At step 2, the SMF sends an N4 session termination request message to the UPF. At step 3, the UPF identifies the N4 session context to be terminated based on the session identifier and removes the N4 session context. The UPF responds with an N4 session termination response message containing information that the UPF has to be provided to the SMF.

Figure 15:
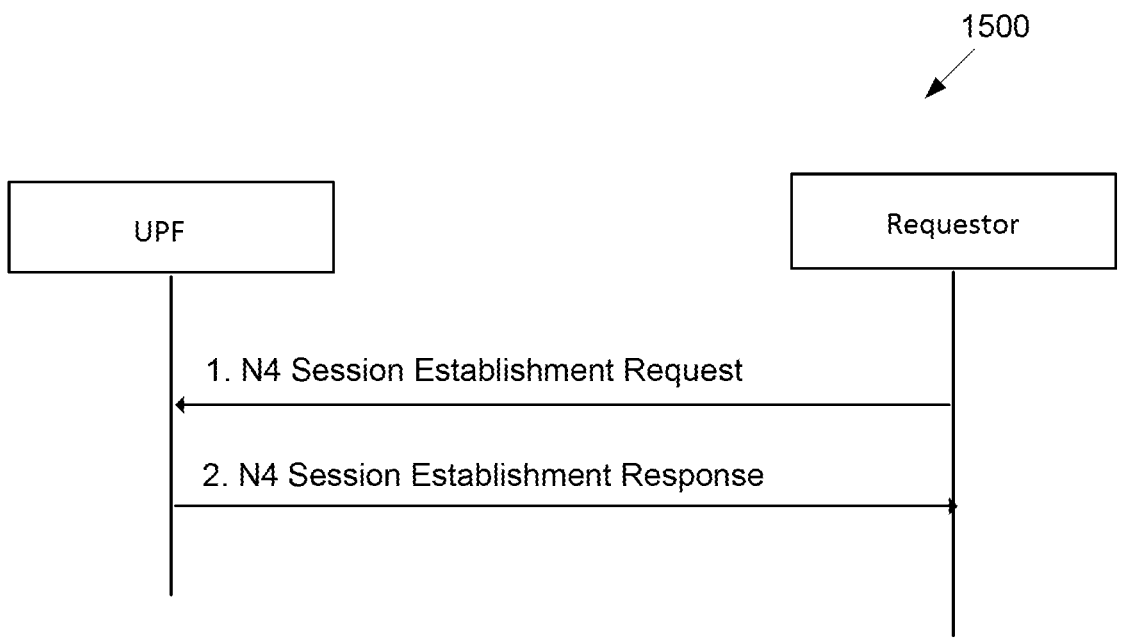
FIG. 15 illustrates an example N4 session establishment service according to embodiments of the present disclosure.

In some embodiments of service description, the requestor queries the UPF to create N4 session context for a connection of a PDU session. In some embodiments of input, session identifier and other parameters/rules listed in clause "parameters exchanged over N4" of the present disclosure. In some embodiments of output, N4 session context is created to control each bearer connections associated with the PDU session FIG. 15 illustrates an example N4 session establishment service 1500 according to embodiments of the present disclosure. An embodiment of the N4 session establishment service 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As shown in FIG. 15, at step 1, a requestor sends an N4 session establishment request (session identifier and other parameters/rules) message requesting the UPF to create N4 session context. At step 2, the UPF creates an N4 session context and responds with an N4 session establishment response (session identifier, other parameters and control information) message providing status of the N4 session establishment response message's action based on the request.

Figure 16:
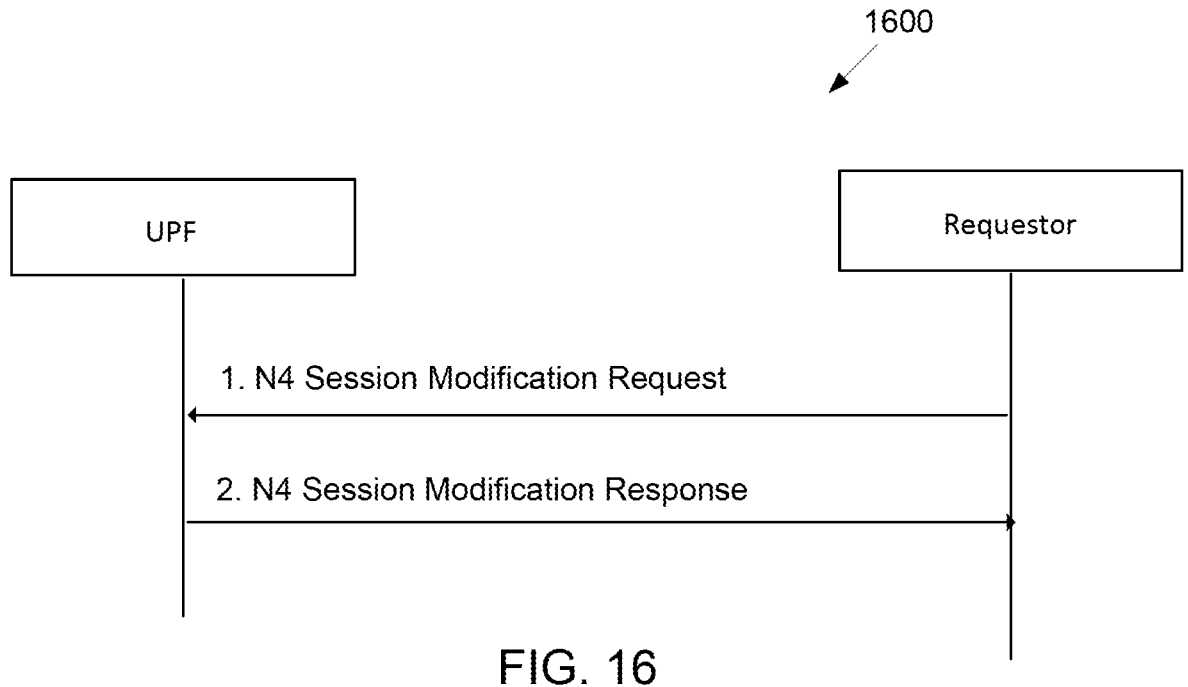
FIG. 16 illustrates an example N4 session modification service according to embodiments of the present disclosure.

FIG. 16 illustrates an example N4 session modification service 1600 according to embodiments of the present disclosure. An embodiment of the N4 session modification service 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As shown in FIG. 16, at step 1, a requestor sends an N4 session modification request (session identifier and other parameters/rules) message requesting the UPF to update existing N4 session context. At step 2, the UPF updates an N4 session context and responds with an N4 Session modification response (session identifier and other parameters/rules) message providing status of N4 Session modification response message's action based on the request. In some embodiments of service description, the requestor queries the UPF to modify existing N4 session context.

Figure 17:
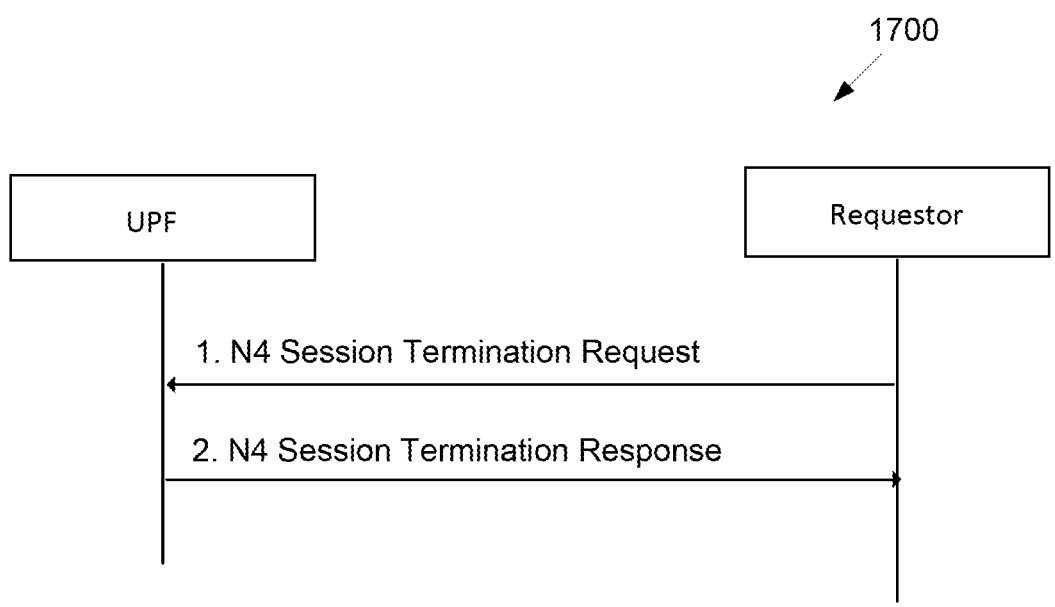
FIG. 17 illustrates an example N4 session termination service according to embodiments of the present disclosure.

FIG. 17 illustrates an example N4 session termination service 1700 according to embodiments of the present disclosure. An embodiment of the N4 session termination service 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

As shown in FIG. 17, at step 1, a requestor sends an N4 session termination request message requesting the UPF to remove existing N4 session context. At step 2, the UPF removes an N4 session context and responds with an N4 session termination response (session identifier, status) message providing status of N4 session termination response message's action.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method in a wireless communication system, the method comprising:
 receiving, from a target access network (AN), a path switch request message to inform that a user equipment (UE) has moved to the target AN, wherein the path switch request includes a list of sessions to be switched;
 transmitting, to a session management function (SMF), a first control message in response to receiving the path switch request message;
 receiving, from the SMF, one or more second control messages generated based on the first control message, the one or more second control messages including one or more tunnel information respectively;
 aggregating the one or more tunnel information received from the SMF; and
 transmitting, to the target AN, a path switch request acknowledgement (Ack) message including the aggregated tunnel information.

2. The method of claim 1, wherein the first control message enables the SMF to determine whether a user plane function (UPF) continues to serve the UE.

3. A method of a session management function (SMF) in a wireless communication system, the method comprising:
 receiving a first control message;
 determining that a source user plane function (UPF) does not continue to serve a user equipment (UE) based on the first control message;
 selecting a target UPF based on a predetermined criteria in response to the source UPF not continuing to serve the UE;
 allocating tunnel information associated with an uplink (UL) and a downlink (DL); and
 transmitting, to the target UPF, a session establishment request message including the tunnel information.

4. The method of claim 3, further comprising:
 receiving, from the target UPF, a session establishment response message in response to the session establishment request message;
 starting a timer in response to receiving the session establishment response message; and
 performing source UPF release procedure in response to the timer expiring.

5. The method of claim 3, further comprising:
 transmitting, to a UPF with PDU session anchor (PSA), a session modification request message; and
 receiving, from the UPF with the PSA, a session modification response message in response to the session modification request message.

6. The method of claim 5, further comprising:
 transmitting a second control message corresponding to the first control message, the second control message including the tunnel information,
 wherein the second control message is transmitted after receipt of the session modification response message.

7. The method of claim 3, wherein the predetermined criteria comprises at least one of:
 information on a dynamic load of at least one UPF,
 information on a relative static capacity of at least one UPF,
 information on a location of at least one UPF available at the SMF,
 information on capability of at least one UPF and functionality required for a particular UE session, or
 information on a local operator policy.

* * * * *